(12) United States Patent
Dent et al.

(10) Patent No.: US 11,164,170 B2
(45) Date of Patent: *Nov. 2, 2021

(54) PROCESSING SYSTEM FOR PROVIDING A TELLER ASSISTANT EXPERIENCE USING ENHANCED REALITY INTERFACES

(71) Applicant: Bank of America Corporation, Charlotte, NC (US)

(72) Inventors: Nathan Dent, Concord, NC (US); Matthew E. Carroll, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/929,612

(22) Filed: Jul. 15, 2020

(65) Prior Publication Data
US 2020/0349539 A1    Nov. 5, 2020

Related U.S. Application Data

(63) Continuation of application No. 16/124,513, filed on Sep. 7, 2018, now Pat. No. 10,755,250.

(51) Int. Cl.
*G06Q 20/10* (2012.01)
*H04N 7/14* (2006.01)

(52) U.S. Cl.
CPC ......... *G06Q 20/1085* (2013.01); *H04N 7/141* (2013.01)

(58) Field of Classification Search
CPC ..................... G06Q 20/1085; H04N 7/141

USPC .......................................... 348/14.01–14.16
See application file for complete search history.

(56) References Cited

U.S. PATENT DOCUMENTS

| 6,083,270 | A  | 7/2000  | Scott |
| 6,945,457 | B1 | 9/2005  | Barcelou |
| 7,305,691 | B2 | 12/2007 | Cristofalo |
| 9,547,960 | B2 | 1/2017  | Thomas et al. |

(Continued)

OTHER PUBLICATIONS

Mar. 2, 20191—U.S. Office Action—U.S. Appl. No. 16/124,316.

(Continued)

*Primary Examiner* — Hemant S Patel
(74) *Attorney, Agent, or Firm* — Banner & Witcott, Ltd.; Michael A. Springs

(57) ABSTRACT

Aspects of the disclosure relate to processing systems that provide a teller assistant experience using enhanced reality interfaces. The computing platform may initiate a video call with an enhanced reality device, which may cause the enhanced reality device to display a user of the computing platform in a portion of a teller assistance experience interface and may cause the computing platform to display a video stream corresponding to a user of the enhanced reality device. The computing platform may receive a request to generate a teller experience notification based on the video stream. The computing platform may generate commands directing an enhanced reality teller control platform to generate the teller experience notification. The computing platform may send, to the enhanced reality teller control platform, the commands, which may cause the enhanced reality teller control platform to direct the enhanced reality device to display the teller experience notification.

20 Claims, 13 Drawing Sheets

(56) References Cited

U.S. PATENT DOCUMENTS

| | | |
|---|---|---|
| 9,792,594 B1 | 10/2017 | Bayha et al. |
| 9,805,513 B2 | 10/2017 | Suto et al. |
| 9,825,800 B2 | 11/2017 | Jung et al. |
| 9,830,504 B2 | 11/2017 | Masood et al. |
| 9,832,338 B2 | 11/2017 | Roberts |
| 9,833,697 B2 | 12/2017 | Grant et al. |
| 9,836,736 B1 | 12/2017 | Neale et al. |
| 9,846,486 B2 | 12/2017 | Katz |
| 9,846,996 B1 | 12/2017 | Moore |
| 9,848,009 B2 | 12/2017 | Turgeman et al. |
| 9,880,256 B2 | 1/2018 | Baxley et al. |
| 9,880,623 B2 | 1/2018 | Lacroix et al. |
| 9,898,901 B1 | 2/2018 | Kurian et al. |
| 9,912,880 B2 | 3/2018 | Seo et al. |
| 9,947,012 B2 | 4/2018 | Smith et al. |
| 9,948,492 B2 | 4/2018 | Jung et al. |
| 9,977,507 B2 | 5/2018 | Katz |
| 9,992,429 B2 | 6/2018 | Baumert et al. |
| 9,992,491 B2 | 6/2018 | Sen et al. |
| 9,996,830 B2 | 6/2018 | Lacoss-Arnold et al. |
| 10,013,564 B2 | 7/2018 | Holman et al. |
| 10,027,684 B1 | 7/2018 | Paterson et al. |
| 10,037,421 B2 | 7/2018 | Turgeman et al. |
| 10,037,628 B2 | 7/2018 | Suto et al. |
| 10,042,445 B1 | 8/2018 | Boelter |
| 10,049,533 B2 | 8/2018 | Kurian et al. |
| 10,061,910 B2 | 8/2018 | Bali et al. |
| 10,069,703 B2 | 9/2018 | Jung et al. |
| 10,069,837 B2 | 9/2018 | Turgeman et al. |
| 10,069,852 B2 | 9/2018 | Turgeman et al. |
| 10,069,958 B1 | 9/2018 | Kurian |
| 10,755,250 B2 * | 8/2020 | Dent .................. G06Q 20/1085 |
| 2004/0236830 A1 | 11/2004 | Nelson et al. |
| 2009/0171752 A1 | 7/2009 | Galvin et al. |
| 2014/0025567 A1 | 1/2014 | Rigby et al. |
| 2014/0176603 A1 | 6/2014 | Kumar et al. |
| 2016/0098709 A1 | 4/2016 | Johnson et al. |
| 2016/0132847 A1 | 5/2016 | Sarris |

OTHER PUBLICATIONS

Feb. 10, 2020—U.S. Non Final Office Action—U.S. Appl. No. 16/124,513.

Jun. 10, 2020—U.S. Notice of Allowance—U.S. Appl. No. 16/124,513.

* cited by examiner

305

Enhanced Reality Authentication Interface

Send Teller Notification?

Yes   No

405

Enhanced Reality Transaction Interface

PROCESSING SYSTEM FOR PROVIDING A TELLER ASSISTANT EXPERIENCE USING ENHANCED REALITY INTERFACES

CROSS-REFERENCE TO RELATED APPLICATIONS

The present application is a continuation of U.S. application Ser. No. 16/124,513, filed Sep. 7, 2018, and entitled "Processing System For Providing a Teller Assistant Experience Using Enhanced Reality Interfaces," which is hereby incorporated by reference in its entirety.

BACKGROUND

Aspects of the disclosure relate to enhanced processing systems for providing a teller assistant experience at an automated teller machine terminal platform using enhanced reality interfaces. In particular, one or more aspects of the disclosure relate to computing platforms that utilize enhanced reality interfaces to provide a live teller video feed along with user-assistance and/or security notifications at an enhanced reality device. This may enable organizations operating such computing platforms to provide users with real-time video-based transaction assistance at an automated teller machine that might not otherwise have video capabilities.

Many organizations and individuals rely on automated teller machines as a means for conducting transactions and providing account access. It may be important to provide assistance for customers interacting with automated teller machines to ensure proper and reliable operations of such machines as well as consistent and convenient customer experiences. In many instances, however, display screens and cameras implemented into automated teller machines may be costly to install and to maintain. In addition, if assistance is provided only when customers are physically at the automated teller machines, it may prevent other functionality from being provided to the customer. This may lead to operational inefficiencies in automated teller machines, malfunctions, and/or delays.

SUMMARY

Aspects of the disclosure provide effective, efficient, scalable, and convenient technical solutions that address and overcome the technical problems associated with providing an assisted teller experience at an automated teller machine. For example, some aspects of the disclosure provide techniques that may enable computing platforms to cause display of enhanced reality interfaces to provide transaction assistance and increase security corresponding to automated teller machine transactions. Additional aspects of the disclosure provide techniques for establishing a video call between an enhanced reality device and a teller interaction platform and sending notifications from the teller interaction platform to the enhanced reality device based on the video call.

In accordance with an embodiment of the disclosure, a computing platform comprising at least one processor, a communication interface, and memory storing computer-readable instructions may establish, with an enhanced reality device, a first wireless data connection. While the first wireless data connection is established, the computing platform may receive pre-transaction information corresponding to an interaction with an automated teller machine terminal platform. Based on the pre-transaction information, the computing platform may generate teller assistant experience information and one or more commands directing the enhanced reality device to generate a teller assistant experience interface using the teller assistant experience information. While the first wireless data connection is established, the computing platform may send, to the enhanced reality device, the teller assistant experience information and the one or more commands directing the enhanced reality device to generate the teller assistant experience interface using the teller assistant experience information. The computing platform may cause the enhanced reality device to establish a second wireless data connection with a teller interaction platform. Using the second wireless data connection, the computing platform may initiate a video call between the enhanced reality device and the teller interaction platform, which may be displayed at the enhanced reality device in a portion of the teller assistant experience interface.

In some embodiments, the computing platform may receive a navigation interface request from the enhanced reality device. The computing platform may generate navigation interface information and one or more commands directing the enhanced reality device to cause display of a navigation interface using the navigation interface information. The computing platform may send, to the enhanced reality device, the navigation interface information and the one or more commands directing the enhanced reality device to cause display of the navigation interface using the navigation interface information.

In some embodiments, the pre-transaction information may correspond to a type of transaction to be conducted and information corresponding to a user of the enhanced reality device. In some embodiments, the computing platform may establish a third wireless data connection with the teller interaction platform. The computing platform may receive, from the teller interaction platform, one or more commands directing the computing platform to generate a teller experience notification to be displayed to a user at the enhanced reality device along with the teller assistant experience interface. Based on the one or more commands directing the computing platform to generate the teller experience notification to be displayed to the user at the enhanced reality device along with the teller assistant experience interface, the computing platform may generate the teller experience notification and one or more commands directing the enhanced reality device to display the teller experience notification. The computing platform may send, to the enhanced reality device, the teller experience notification and the one or more commands directing the enhanced reality device to display the teller experience notification.

In some embodiments, the teller experience notification may correspond to one of: a transaction assistance notification to assist the user in conducting a transaction or a security notification to assist the user in safely conducting the transaction. In some embodiments, the transaction may correspond to a transaction conducted at the automated teller machine terminal platform.

In some embodiments, the computing platform may receive, from the enhanced reality device, a post-transaction request indicating a request to continue a transaction after departing from the automated teller machine terminal platform. In response to the post-transaction request, the computing platform may generate post-transaction interface information and one or more commands directing the enhanced reality device to update the teller assistant experience interface using the post-transaction interface information. The computing platform may send, to the enhanced reality device, the post-transaction interface information and the one or more commands directing the enhanced reality device to update the teller assistant experience interface using the post-transaction interface information.

In some embodiments, the updated teller assistant experience interface may correspond to additional services offered by an institution corresponding to the automated teller machine terminal platform that may be provided after departing from the automated teller machine terminal platform. In some embodiments, initiating the video call between the enhanced reality device and the teller interaction platform causes the enhanced reality device to capture video content using an inward facing camera and an outward facing camera of the enhanced reality device.

In accordance with an embodiment of the disclosure, a computing platform comprising at least one processor, a communication interface, and memory storing computer-readable instructions may establish, with an enhanced reality device, a first wireless data connection. Using the first wireless data connection, the computing platform may initiate a video call with the enhanced reality device. Initiating the video call with the enhanced reality device may cause the enhanced reality device to display a user of the computing platform in a portion of a teller assistance experience interface and may cause the computing platform to display a video stream corresponding to a viewpoint of a user of the enhanced reality device. The computing platform may receive a request to generate a teller experience notification based on the video stream corresponding to the viewpoint of the user of the enhanced reality device. The computing platform may generate one or more commands directing an enhanced reality teller control platform to generate the teller experience notification. The computing platform may establish, with the enhanced reality teller control platform, a second wireless data connection. While the second wireless data connection is established, the computing platform may send, to the enhanced reality teller control platform, the one or more commands directing the enhanced reality teller control platform to generate the teller experience notification, which may cause the enhanced reality teller control platform to direct the enhanced reality device to cause display of the teller experience notification.

In some embodiments, initiating the video call with the enhanced reality device may cause the computing platform to display a video stream corresponding to a rear facing camera of the enhanced reality device. In some embodiments, the video stream corresponding to the viewpoint of the user of the enhanced reality device may be displayed on a display of the computing platform along with the video stream corresponding to a rear facing camera of the enhanced reality device.

In some embodiments, the teller experience notification may correspond to one of an enhanced reality overlay, a haptic feedback output, or an audio output. In some embodiments, directing the enhanced reality device to cause display of the teller experience notification may cause the enhanced reality device to cause display of the teller experience notification along with the teller assistant experience interface.

In some embodiments, the teller experience notification may correspond to one of: a transaction assistance notification to assist the user in conducting a transaction or a security notification to assist the user in safely conducting the transaction. In some embodiments, the security notification may indicate that unidentified personal are located within a predetermined security perimeter corresponding to an automated teller machine terminal platform.

In some embodiments, the transaction may correspond to a transaction conducted at an automated teller machine terminal platform. In some embodiments, the teller assistance experience interface may correspond to an enhanced reality interface that provides transaction assistance during an automated teller machine transaction.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The following description relates to providing enhanced teller assistant experiences using augmented reality (AR) technology. Teller assistant experiences may be offered today using Automated Teller Assist (ATA) devices, which include specialized video conferencing hardware (e.g., integrated video camera, high resolution display screen, high bandwidth network connection, and/or the like) that enable a real-life teller assistant to assist a user in completing transactions at the ATA via video conference. The real-life teller assistant may, e.g., be an employee or other associate of a financial institution located in a physical customer contact center and may, e.g., be connected to different customers at different ATA devices at different times. Using AR technology, this teller assistant experience may be provided at any existing automated teller machine (ATM). In other words, a customer may interact with a real-life remote teller assistant at any ATM using an AR/virtual reality (VR) interface even if the ATM does not include the specialized video conferencing hardware that an ATA typically includes. The AR/VR experience may also have technical advantages over the current experience. For instance, the current experience may be provided via a flat screen at an ATA. In an AR/VR experience, the teller assistant could interact with the customer in 3-D (e.g., "insert your check here, reach over here to get your withdrawal/receipt"). The teller assistant may point and direct the user to different components and also provide support in alternative languages. An additional technical advantage of using an AR/VR experience is a reduction in network bandwidth usage. By implementing the teller assistant experience using an enhanced reality device, the video call between a customer and employee may be streamed using the customer's high-speed data connection rather than a back-end network corresponding to an ATM. Yet another technical advantage of using the AR/VR experience is increased security and privacy during the teller assistant experience. In some instances, security and privacy may be increased due to display of the teller assistant experience on an AR/VR interface rather than a publicly-visible interface of an ATA.

Figure 1A:
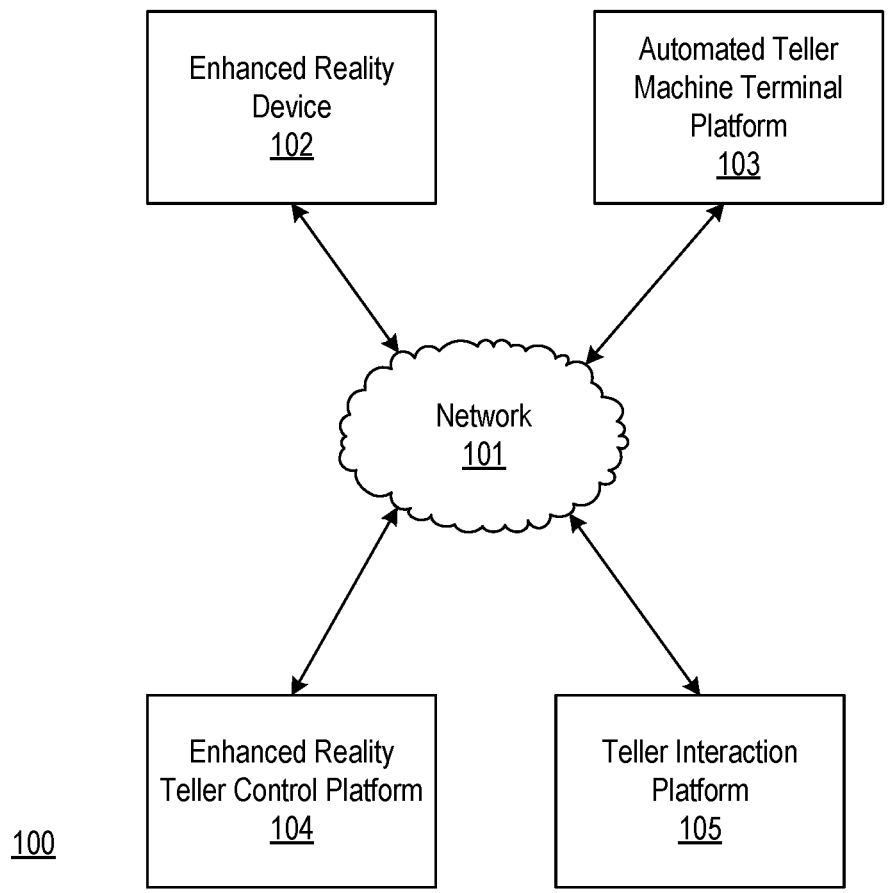
FIGS. 1A and 1B depict an illustrative computing environment for deploying an enhanced processing system that provides a teller assistant experience using enhanced reality interfaces in accordance with one or more example embodiments.
Figure 1B:
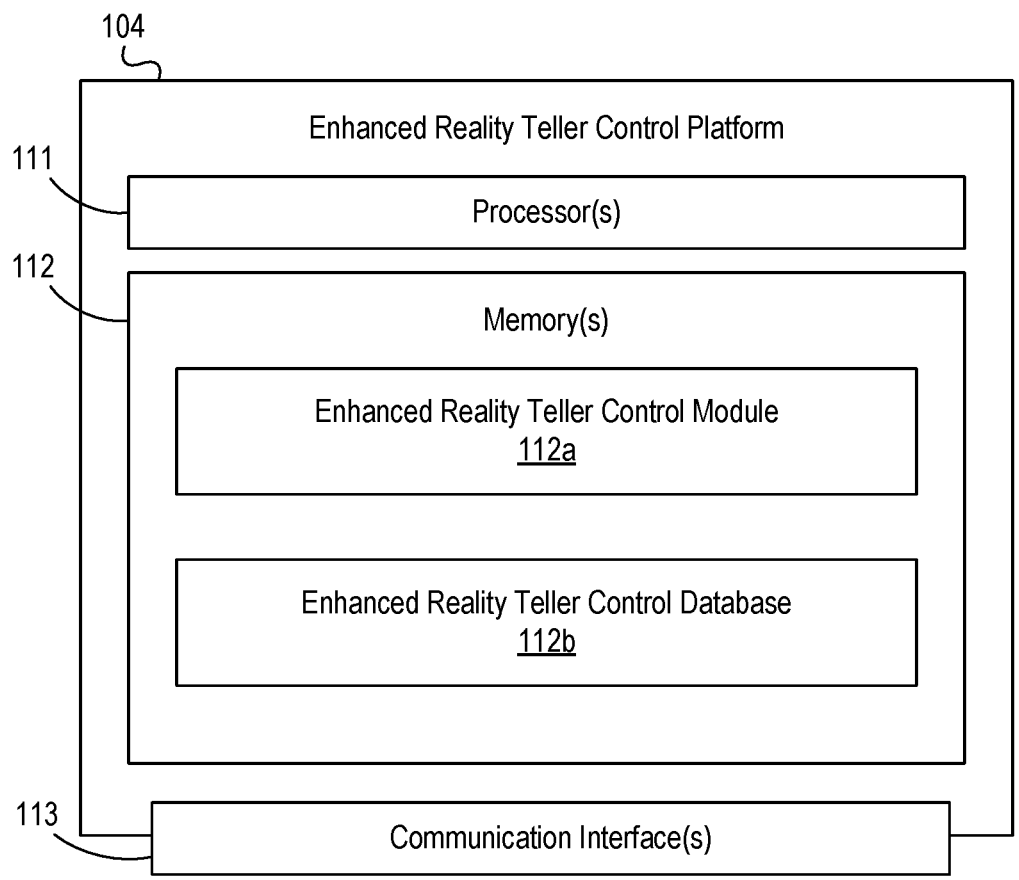

FIGS. 1A-1B depict an illustrative computing environment for providing a teller assistant experience using enhanced reality interfaces in accordance with one or more example embodiments. Referring to FIG. 1A, computing environment 100 may include one or more computer systems. For example, computing environment 100 may include an enhanced reality device 102, an automated teller machine terminal platform 103, an enhanced reality teller control platform 104, and a teller interaction platform 105.

Enhanced reality device 102 may include one or more computing devices and/or other computer components (e.g., processors, memories, communication interfaces). In addition, and as illustrated in greater detail below, enhanced reality device 102 may cause display of and/or otherwise present one or more graphical user interfaces. In some instances, the enhanced reality device 102 may be an augmented reality device, virtual reality device, mobile device, or the like. In some instances, the graphical user interfaces presented by enhanced reality device 102 may provide access to a teller assistant experience, such as an enhanced reality teller assistant experience provided by a financial institution. Such graphical user interfaces, for instance, may provide assistance in conducting transactions such as withdrawals, deposits, transfers, and the like at an automated teller machine terminal platform. In some instances, providing the graphical user interfaces at the enhanced reality device 102 may display teller experience notifications to assist with the transactions (e.g., insert card/check here, enter personal identification number (PIN), unfold check before inserting, or the like) and/or enhance security of the transactions (e.g., unidentified person within predetermined security boundary, please wait before proceeding with transaction, or the like). In some instances, the graphical user interfaces may provide customers of the financial institution with menus, controls, and/or other options to execute various resolution actions (e.g., withdraw, deposit, transfer, or the like).

Automated teller machine terminal platform 103 may be a computer system that includes one or more computing devices and/or other computer components (e.g., processors, memories, communication interfaces). In addition, automated teller machine terminal platform 103 may be configured to receive requests (e.g., requests to process a withdrawal, process a deposit, transfers funds, and the like.) In some instances, the automated teller machine terminal platform 103 may comprise a single automated teller machine. In other instances, the automated teller machine terminal platform 103 may comprise multiple automated teller machines.

As illustrated in greater detail below, enhanced reality teller control platform 104 may be configured to generate, host, transmit, and/or otherwise provide one or more graphical user interfaces (which may, e.g., cause one or more other computer systems to display and/or otherwise present one or more other graphical user interfaces). In some instances, the other graphical user interfaces generated by enhanced reality teller control platform 104 may provide enhanced reality interfaces that may assist a user in performing an automated teller machine transaction and may increase security in performing the automated teller machine transaction. In some instances, the enhanced reality teller control platform may be configured to initiate a video stream between enhanced reality device 102 and teller interaction platform 105.

Teller interaction platform 105 may include one or more computing devices and/or other computer components (e.g., processors, memories, communication interfaces). In addition, and as illustrated in greater detail below, teller interaction platform 105 may cause display of and/or otherwise present one or more graphical user interfaces. In some instances, the enhanced reality device 102 may be desktop computer, a laptop computer, a tablet, a mobile device, or the like. In some instances, the graphical user interfaces presented by teller interaction platform 105 may provide a video stream corresponding to a transaction at an automated teller machine. Such graphical user interfaces, for instance, may provide an employee of an institution, such as a teller at a financial institution, with an opportunity to generate and send various teller experience notifications based on the video stream. Such teller experience notifications may be sent to and displayed at the enhanced reality device 102 to provide assistance and increase security for conducting a transaction at an automated teller machine (e.g., insert card/check here, enter personal identification number (PIN), unfold check before inserting, unidentified personal within predetermined security boundary, please wait before proceeding with transaction, or the like). In some instances, the graphical user interfaces may provide employees of the financial institution with menus, controls, and/or other options to execute various resolution actions (e.g., generate teller experience notification, switch video streams, or the like).

Computing environment 100 also may include one or more networks, which may interconnect enhanced reality device 102, automated teller machine terminal platform 103, enhanced reality teller control platform 104, and teller interaction platform 105. For example, computing environment 100 may include a network 101 (which may interconnect, e.g., enhanced reality device 102, automated teller machine terminal platform 103, enhanced reality teller control platform 104, and teller interaction platform 105).

In one or more arrangements, enhanced reality device 102, automated teller machine terminal platform 103, enhanced reality teller control platform 104, and teller interaction platform 105 may be any type of computing device capable of receiving a user interface, receiving input via the user interface, and communicating the received input to one or more other computing devices. For example, enhanced reality device 102, automated teller machine terminal platform 103, enhanced reality teller control platform 104, teller interaction platform 105, and/or the other systems included in computing environment 100 may, in some instances, be and/or include server computers, desktop computers, laptop computers, tablet computers, smart phones, virtual reality devices, augmented reality devices, or the like that may include one or more processors, memories, communication interfaces, storage devices, and/or other components. As noted above, and as illustrated in greater detail below, any and/or all of enhanced reality device 102, automated teller machine terminal platform 103, enhanced reality teller control platform 104, and teller interaction platform 105 may, in some instances, be special-purpose computing devices configured to perform specific functions.

Referring to FIG. 1B, enhanced reality teller control platform 104 may include one or more processors 111, memory 112, and communication interface 113. A data bus may interconnect processor 111, memory 112, and communication interface 113. Communication interface 113 may be a network interface configured to support communication between enhanced reality teller control platform 104 and one or more networks (e.g., network 101, or the like). Memory 112 may include one or more program modules having instructions that when executed by processor 111 cause enhanced reality teller control platform 104 to perform one or more functions described herein and/or one or more databases that may store and/or otherwise maintain information which may be used by such program modules and/or processor 111. In some instances, the one or more program modules and/or databases may be stored by and/or maintained in different memory units of enhanced reality teller control platform 104 and/or by different computing devices that may form and/or otherwise make up enhanced reality teller control platform 104. For example, memory 112 may have, host, store, and/or include an enhanced reality teller control module 112a and an enhanced reality teller control database 112b. Enhanced reality teller control module 112a may have instructions that direct and/or cause enhanced reality teller control platform 104 to execute advance enhanced reality teller control techniques, as discussed in greater detail below. Enhanced reality teller control database 112b may store information used by enhanced reality teller control module 112a and/or enhanced reality teller control platform 104 in executing enhanced reality teller control techniques and/or in performing other functions.

Figure 2A:
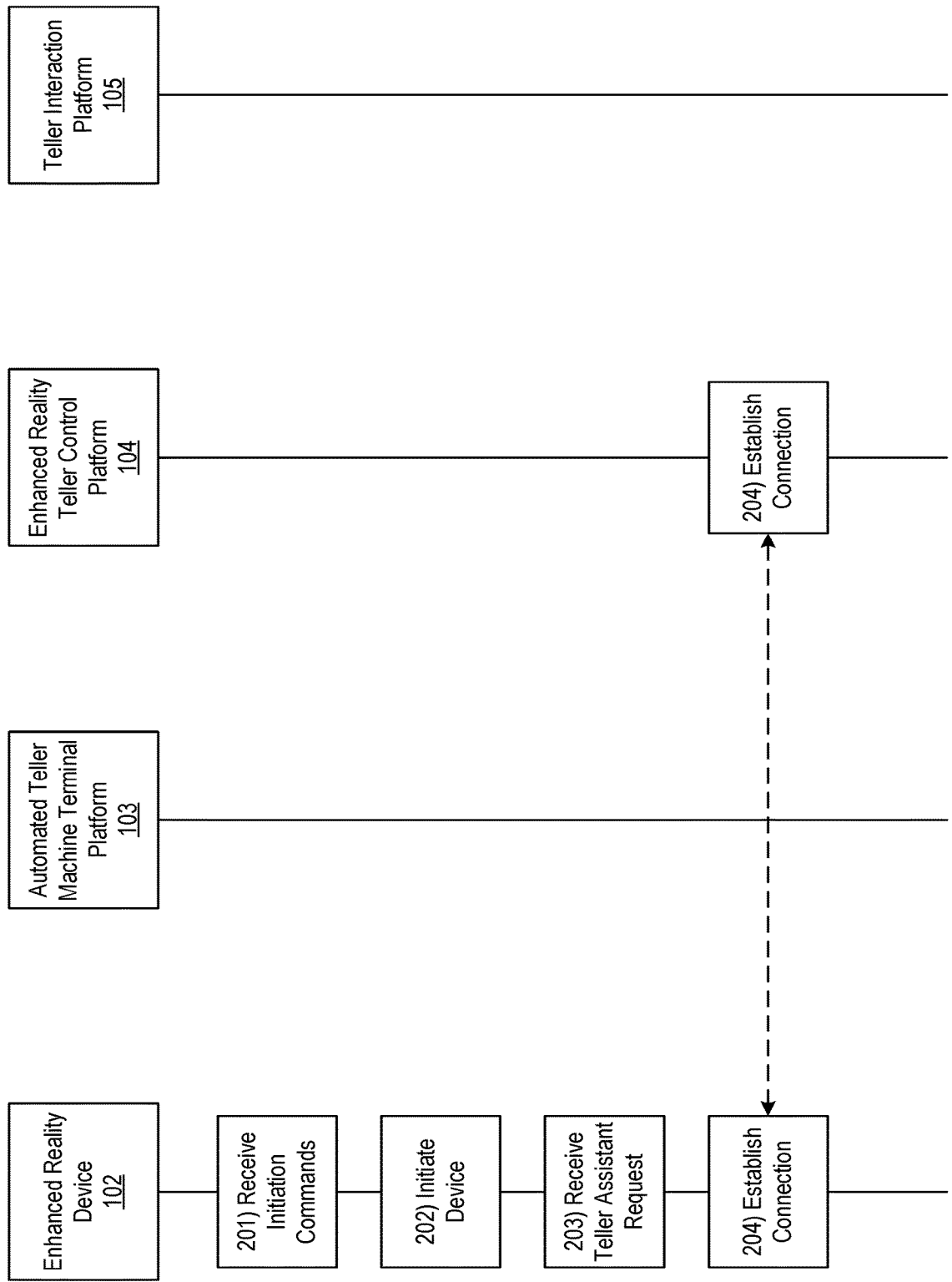
FIGS. 2A-2H depict an illustrative event sequence for deploying an enhanced processing system that provides a teller assistant experience using enhanced reality interfaces in accordance with one or more example embodiments.

FIGS. 2A-2H depict an illustrative event sequence for deploying an enhanced processing system that controls enhanced reality interfaces corresponding to a teller assistance experience in accordance with one or more example embodiments. Referring to FIG. 2A, at step 201, enhanced reality device 102 may receive one or more commands directing the enhanced reality device 102 to initiate. In some instances, the one or more commands directing the enhanced reality device 102 to initiate may be received through a user input such as powering on the enhanced reality device 102 with a power switch, button, toggle, or the like.

At step 202, the enhanced reality device 102 may initiate in response to the one or more commands directing the enhanced reality device 102 to initiate at step 201. In some instances, this step may correspond to the enhanced reality device 102 powering on and loading an initial interface.

At step 203, the enhanced reality device 102 may receive a request to initiate a teller assistant experience. In some instances, in receiving the request to initiate the teller assistant experience, the enhanced reality device 102 may receive a request to provide assistance in conducting a transaction at an automated teller machine terminal platform 103 (e.g., a withdrawal, deposit, transfer, or the like). Additionally or alternatively, in receiving the request to initiate the teller assistant experience, the enhanced reality device 102 may receive a request to initiate a live video stream with a remote teller.

At step 204, the enhanced reality device 102 may establish a connection with enhanced reality teller control platform 104. In some instances, the enhanced reality device 102 may establish a first wireless data connection with the enhanced reality teller control platform 104 to link the enhanced reality device 102 to the enhanced reality teller control platform 104.

Figure 2B:
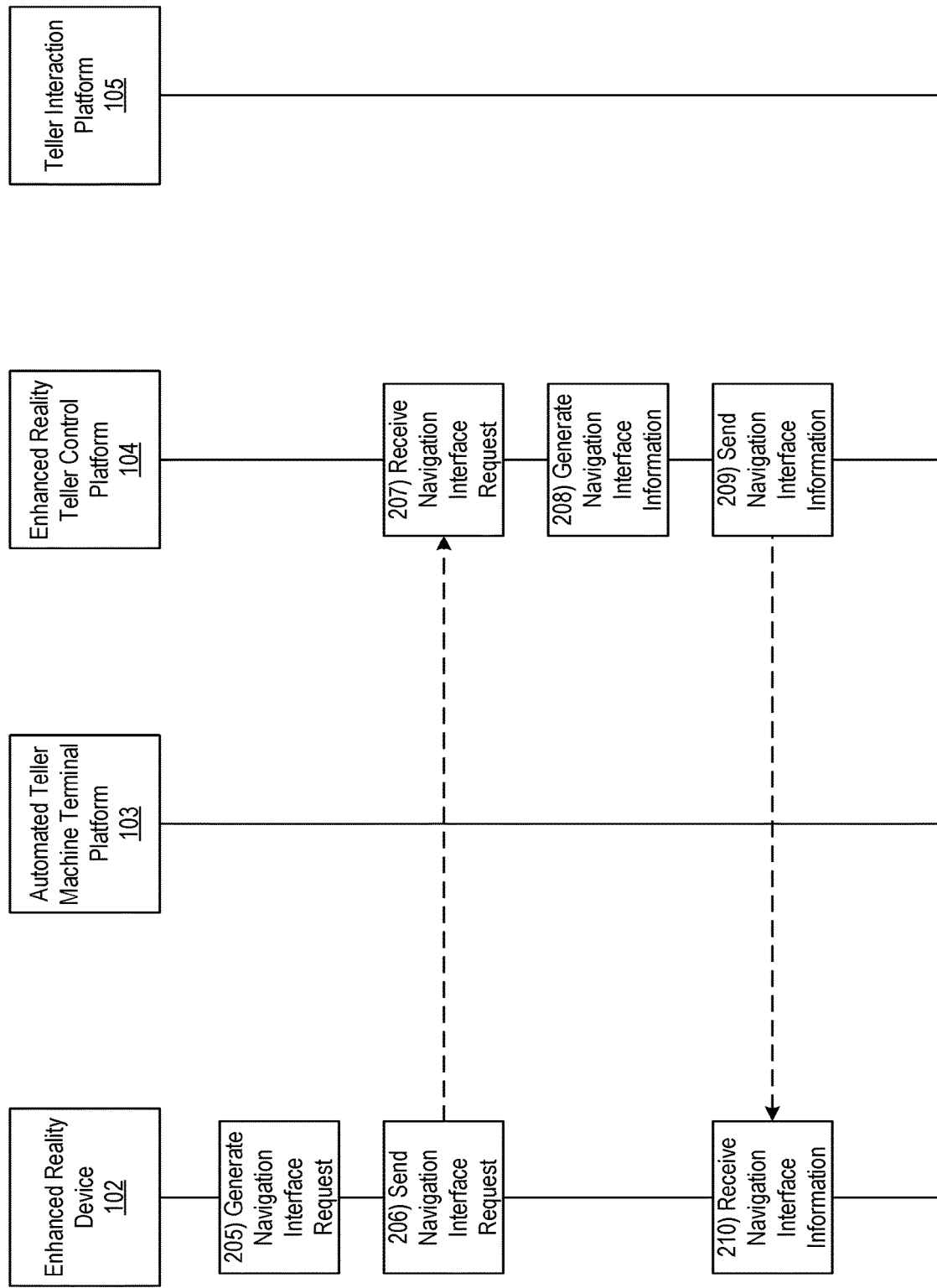

Referring to FIG. 2B, at step 205, the enhanced reality device 102 may generate a request for a teller assistant navigation interface. In some instances, the enhanced reality device 102 may receive the request to initiate the teller assistant experience when a user of the enhanced reality device 102 is located within a pre-determined proximity of the automated teller machine terminal platform 103. In these instances, the enhanced reality device 102 may not generate a navigation interface request and may proceed to step 212. In other instances, the enhanced reality device 102 may receive the request to initiate the teller assistant experience when the user of the enhanced reality device 102 is not located within the predetermined proximity of the automated teller machine terminal platform 103. In these instances, the enhanced reality device 102 may generate a navigation interface request. In generating the navigation interface request, the enhanced reality device may generate a request to provide navigation from a current location of the enhanced reality device to the automated teller machine terminal platform 103.

At step 206, the enhanced reality device 102 may send the request for the teller assistant navigation interface (generated at step 205) to the enhanced reality teller control platform 104. In some instances, the enhanced reality device 102 may send the request for the teller assistant navigation interface to the enhanced reality teller control platform 104 while the first wireless data connection is established.

At step 207, the enhanced reality teller control platform 104 may receive the request for the teller assistant navigation interface sent at step 206. In some instances, the enhanced reality teller control platform 104 may receive, via the communication interface 113 and while the first wireless data connection is established, the request for the teller assistant navigation interface.

At step 208, the enhanced reality teller control platform 104 may generate teller assistant navigation interface information in response to the request for the teller assistant navigation interface. In some instances, in generating the teller assistant navigation interface information, the enhanced reality teller control platform 104 may use global positioning system (GPS) data, geolocation data, or the like to generate information that may be used to generate a navigation interface at the enhanced reality device 102 that may provide step by step directional guidance to direct a user of the enhanced reality device 102 from a current location to the automated teller machine terminal platform 103. In some instances, the enhanced reality teller control platform 104 may determine a location of the enhanced reality device 102, may determine an automated teller machine terminal platform that is closest to the user, and may generate information to provide guidance to that automated teller machine terminal platform. In some instances, in generating the teller assistant navigation interface information, the enhanced reality teller control platform 104 may also generate one or more commands directing the enhanced reality device 102 to generate a teller assistant navigation interface using the teller assistant navigation interface information.

At step 209, the enhanced reality teller control platform 104 may send the teller assistant navigation interface information and the one or more commands directing the enhanced reality device 102 to generate the teller assistant navigation interface using the teller assistant navigation interface information to the enhanced reality device 102. In some instances the enhanced reality teller control platform 104 may send, via the communication interface 113 and while the first wireless data connection is established, the teller assistant navigation interface information.

At step 210, the enhanced reality device 102 may receive the teller assistant navigation interface information and the one or more commands directing the enhanced reality device 102 to generate the teller assistant navigation interface using the teller assistant navigation interface information. In some instances, the enhanced reality device may receive, while the first wireless data connection is established, the teller assistant navigation interface information and the one or more commands directing the enhanced reality device 102 to generate the teller assistant navigation interface using the teller assistant navigation interface information.

Figure 2C:
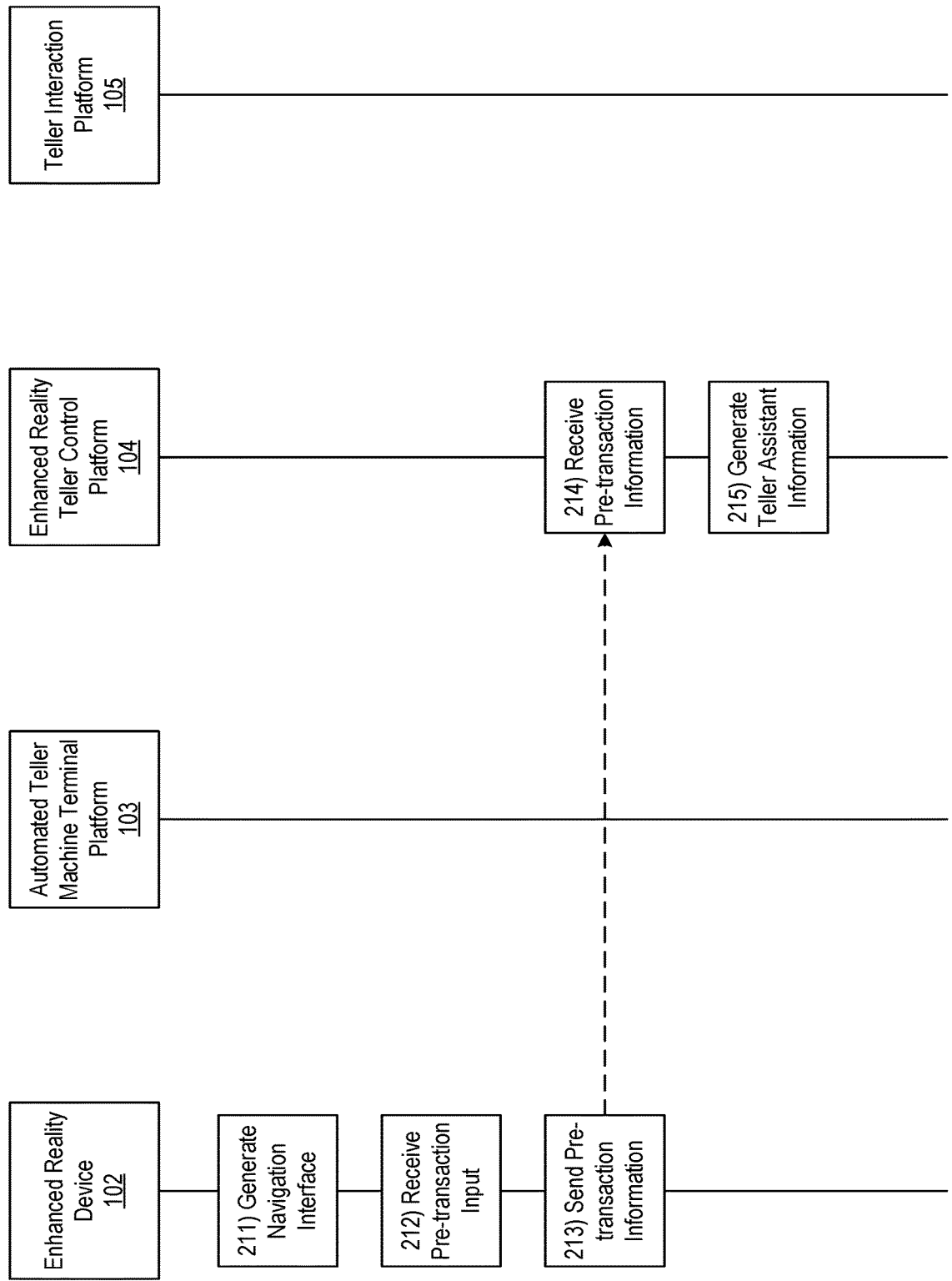

Referring to FIG. 2C, at step 211, the enhanced reality device 102 may generate the teller assistant navigation interface using the teller assistant navigation interface information received at step 210. In some instances, as described above, in generating the teller assistant navigation interface the enhanced reality device 102 may generate an interface to direct a user of the enhanced reality device 102 to the automated teller machine terminal platform 103. In some instances, in generating the teller assistant navigation interface, the enhanced reality device 102 may present one or more automated teller machine terminal platform locations to the user via a display of the enhanced reality device 102. In these instances, the enhanced reality device 102 may receive a user input corresponding to one of the automated teller machine terminal platform locations, and may display the teller assistant navigation interface to direct the user to the selected automated teller machine terminal platform location.

At step 212, the enhanced reality device 102 may receive pre-transaction input corresponding to a transaction to be conducted at the automated teller machine terminal platform 103. In some instances, in receiving the pre-transaction input corresponding to a contemplated transaction to be conducted at the automated teller machine terminal platform 103, the enhanced reality device 102 may receive input corresponding to a type of transaction to be conducted, user information, or the like. In some instances, the enhanced reality device 102 may receive the pre-transaction input corresponding to the transaction to be conducted at the automated teller machine terminal platform 103 while causing display of the teller assistant navigation interface. As a result, because the user may be walking towards the automated teller machine terminal platform 103 but might not yet have arrived, the enhanced reality device 102 may pre-stage the transaction as the user approaches the automated teller machine terminal platform 103 (e.g., based on receiving the pre-transaction input at the enhanced reality device 102) so as to minimize wait times for the user and other users caused by entry of the pre-transaction input at the automated teller machine terminal platform 103. In some instances, in receiving the pre-transaction input, the enhanced reality device 102 may receive one or more of a gesture input, an audio input, a touch input, a detected eye movement, or the like to indicate the pre-transaction input. In receiving the pre-transaction input, the enhanced reality device 102 may cause efficiency gains with respect to automated teller machine transactions that otherwise would not be able to initiate until a customer is physically located at the automated teller machine terminal platform 103.

Although step 212 is described with respect to receiving a pre-transaction input corresponding to a transaction to be conducted at the automated teller machine terminal platform 103, it should also be understood that a pre-transaction input corresponding to a transaction to be conducted with a live teller in a branch office of a financial institution may also be received. In some instances, in receiving the pre-transaction input, the enhanced reality device 102 may receive an input indicating a reason why the customer is heading to the branch office of the financial institution, a type of employee the customer would like to speak with (e.g., loan officer, teller, notary, or the like), or the like. In some instances, pre-transaction information may be sent to one or more employees at the branch office of the financial institution based on the pre-transaction input, and the one or more employees may provide responsive input (e.g., to enhanced reality teller control platform 104, teller interaction platform 105, and/or one or more other systems and/or devices) indicating whether they are eligible to assist the customer based on the pre-transaction information. In some instances, this approach may reduce or eliminate an amount of time the customer may wait in line to conduct the transaction.

At step 213, the enhanced reality device 102 may send the pre-transaction information based on the pre-transaction input received at step 212 to the enhanced reality teller control platform 104. In some instances, the enhanced reality device 102 may send the pre-transaction information to the enhanced reality teller control platform 104 while the first wireless data connection is established.

At step 214, the enhanced reality teller control platform 104 may receive the pre-transaction information sent at step 213. In some instances, the enhanced reality teller control platform 104 may receive the pre-transaction information via the communication interface 113 and while the first wireless data connection is established.

At step 215, the enhanced reality teller control platform 104 may generate teller assistant experience information and one or more commands directing the enhanced reality device 102 to generate a teller assistant experience interface using the teller assistant experience information. In some instances, the enhanced reality teller control platform 104 may generate the teller assistant experience information based on the pre-transaction information received at step 214. In some instances, in generating the teller assistant experience information, the enhanced reality teller control platform 104 may generate information that may be used to generate an enhanced reality interface that may be displayed via the enhanced reality device 102 and may provide assistance with a transaction at the automated teller machine terminal platform 103.

Figure 2D:
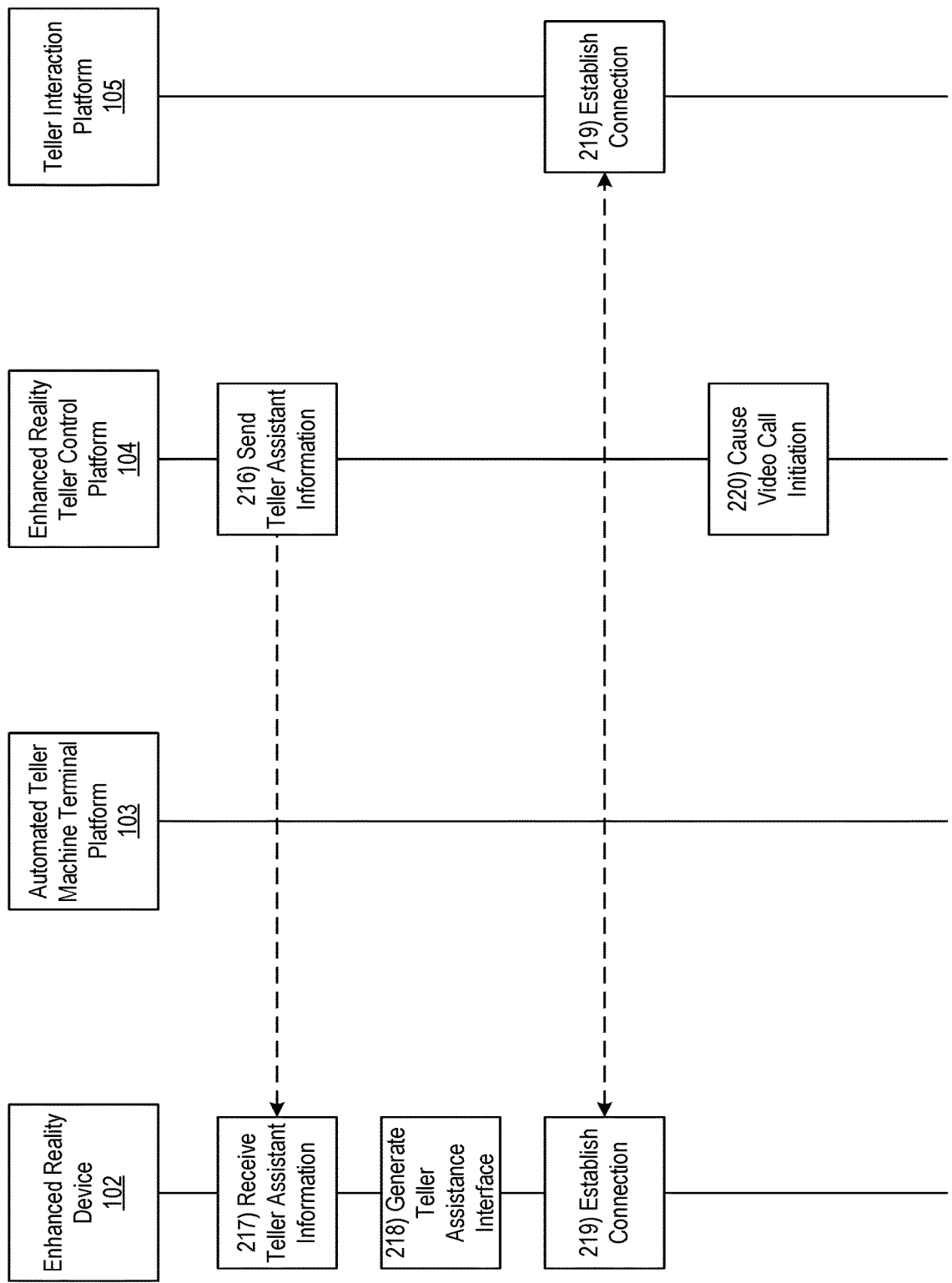

Referring to FIG. 2D, at step 216, the enhanced reality teller control platform 104 may send the teller assistant experience information and the one or more commands directing the enhanced reality device 102 to generate the teller assistant experience interface generated at step 215. In some instances, the enhanced reality teller control platform 104 may send, via the communication interface and while the first wireless data connection is established, the teller assistant experience information and the one or more commands directing the enhanced reality device 102 to generate the teller assistant experience interface.

At step 217, the enhanced reality device 102 may receive the teller assistant experience information and the one or more commands directing the enhanced reality device 102 to generate the teller assistant experience interface sent at step 216. In some instances, the enhanced reality device 102 may receive, while the first wireless data connection is still established, the teller experience information and the one or more commands directing the enhanced reality device 102 to generate the teller assistant experience interface.

At step 218, the enhanced reality device 102 may generate a teller assistant experience interface using the teller assistant experience information received at step 217. In some instances, the enhanced reality device 102 may wait to generate the teller assistant experience interface until determining that the enhanced reality device 102 is located within a predetermined distance of the automated teller machine terminal platform 103 (e.g., the interface may be displayed once the user arrives at the automated teller machine terminal platform 103). In other instances, the enhanced reality device 102 may generate the teller assistant experience interface regardless of whether the enhanced reality device 102 is located within the predetermined distance of the automated teller machine terminal platform 103 (e.g., the user may begin to interact with the teller assistant experience interface before arriving at the automated teller machine terminal platform 103). In some instances, in generating the teller assistant experience interface, the enhanced reality device 102 may display information corresponding to the automated teller machine terminal platform 103 (e.g., device status, device type, device capabilities, or the like). In some instances, this information may also be displayed as part of the teller assistant navigation interface described above. Once the teller assistant experience interface is generated, the enhanced reality device 102 may display the teller assistant experience interface which may be used to provide assistance with and/or various notifications corresponding to the transaction. In some instances, by generating the teller assistant experience interface as an enhanced reality interface (e.g., as an augmented reality interface that is displayed as an overlay on top of one or more real-world objects that may be visible through one or more transparent and/or translucent display elements of an augmented reality device, such as enhanced reality device 102), the enhanced reality device 102 may enhance privacy corresponding to automated teller transactions. By moving various interfaces to the enhanced reality device 102, only the user of the enhanced reality device 102 may be able to view the interfaces (in contrast to interfaces publicly displayed as a portion of an automated teller machine). In addition, conducting a live teller assistance experience on an automated teller machine may consume a significant amount of bandwidth and processing power of the automated teller machine. By implementing an enhanced reality device and an enhanced reality teller control platform to facilitate the live teller assistance experience, the amount of processing power and network bandwidth required and/or consumed by an automated teller machine and associated network in providing a live teller assistance experience may be reduced.

At step 219, the enhanced reality device 102 may establish a connection with the teller interaction platform 105. In some instances, the enhanced reality device 102 may establish a second wireless data connection with the teller interaction platform 105 to link the enhanced reality device 102 and the teller interaction platform 105.

At step 220, the enhanced reality teller control platform 104 may cause a video call to be initiated between the enhanced reality device 102 and the teller interaction platform 105. In other instances, the enhanced reality device 102 may cause the video call to be initiated with the teller interaction platform 105 without using the enhanced reality teller control platform 104.

Figure 2E:
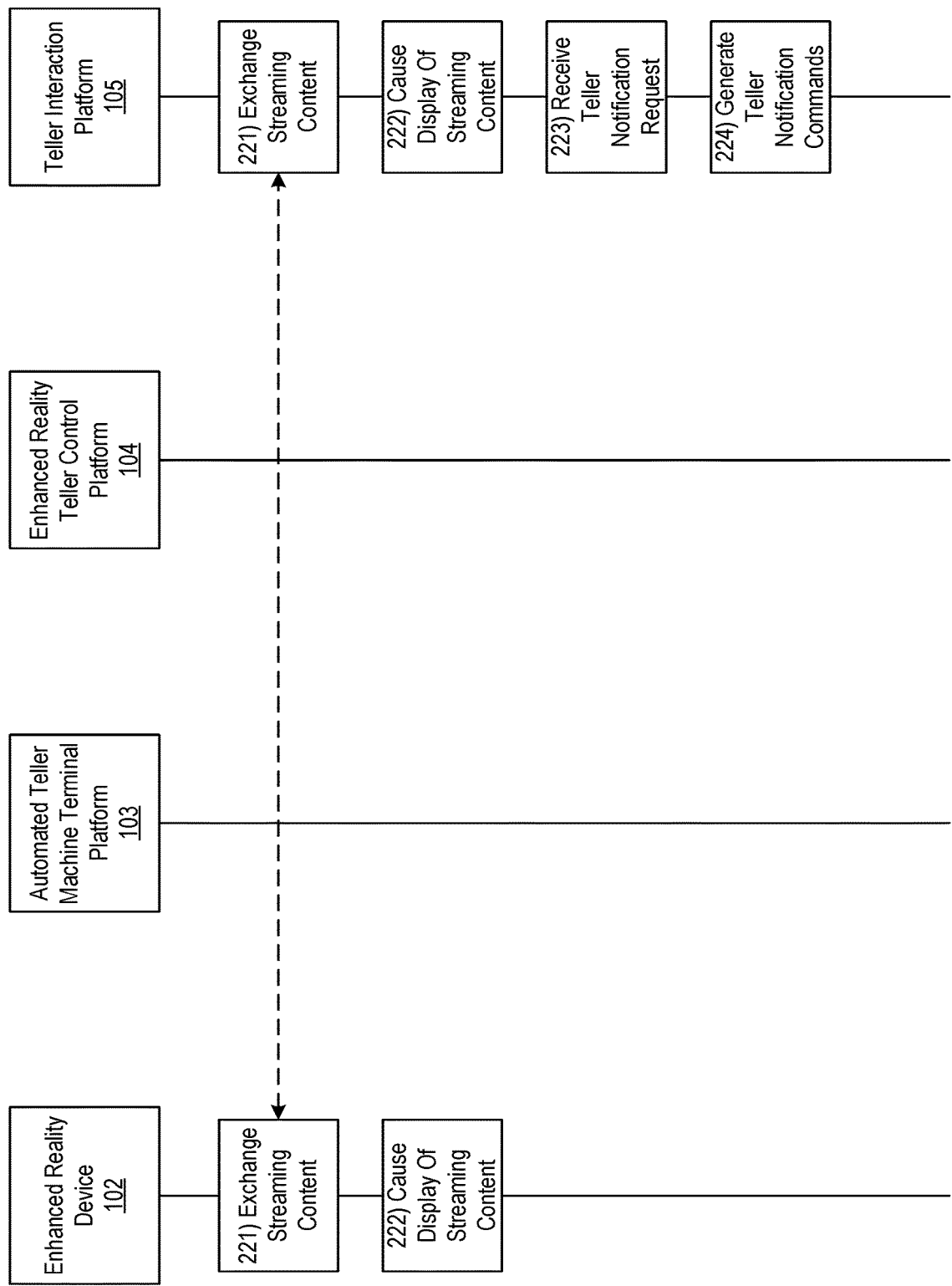

Referring to FIG. 2E, at step 221, the enhanced reality device 102 and the teller interaction platform 105 may exchange streaming content. In some instances, the enhanced reality device 102 may record the streaming content using an outward facing camera (which may, e.g., capture and/or otherwise provide a view of the automated teller machine terminal platform 103 from the perspective of a user of the enhanced reality device 102). In these instances, the outward facing camera may be directed away from the user and/or user's viewing angle. Additionally or alternatively, the enhanced reality device 102 may record the streaming content using an inward facing camera (which may, e.g., capture and/or otherwise provide a view of the user of the enhanced reality device 102 from the perspective of the automated teller machine terminal platform). In these instances, the inward facing camera may be directed towards the user and/or user's viewing angle. In some instances, the teller interaction platform 105 may record the streaming content using a camera embedded in the teller interaction platform 105 (e.g., a view of the live teller stationed at the teller interaction platform). In these instances, the streaming content may be shared between the enhanced reality device 102 and the teller interaction platform 105. In some instances, the enhanced reality device 102 and the teller interaction platform 105 may exchange the streaming content while the second wireless data connection is established.

Figure 3:
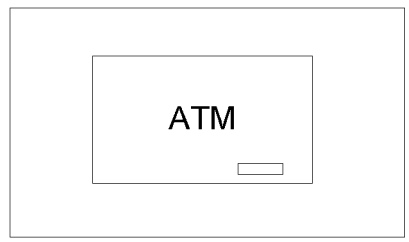
FIGS. 3 and 4 depict example graphical user interfaces for deploying an enhanced processing system that provides a teller assistant experience using enhanced reality interfaces in accordance with one or more example embodiments.

At step 222, the enhanced reality device 102 and the teller interaction platform 105 may each display the exchanged streaming content. In some instances, in displaying the exchanged streaming content, the teller interaction platform 105 may cause display of a graphical user interface similar to graphical user interface 305, which is illustrated in FIG. 3. As seen in FIG. 3, graphical user interface 305 may include a video stream corresponding to a customer's view of the automated teller machine terminal platform 103. This may allow an employee of a financial institution corresponding to the automated teller machine terminal platform 103 to observe the customer's interactions with the automated teller machine terminal platform 103 and may prompt the employee regarding whether or not a teller notification should be sent. As an example, the employee may see that the customer appears confused as to where to insert a debit card. As a result, the employee may request that a notification be sent to the enhanced reality device 102 to highlight a slot on the automated teller machine terminal platform 103 where the debit card should be inserted. Additionally or alternatively, the exchanged streaming content may include audio, and the employee may be able to talk the customer through the transaction. In some instances, the teller interaction platform 105 may include a video stream corresponding to a view of the customer from the perspective of the automated teller machine terminal platform. In some instances, the employee may be able to toggle between multiple video feeds. In some instances, these video feeds may be displayed as an augmented reality interface that is displayed as an overlay on top of one or more real-world objects that may be visible through one or more transparent and/or translucent display elements of an augmented reality device, such as enhanced reality device 102 and/or the teller interaction platform 105.

Figure 4:
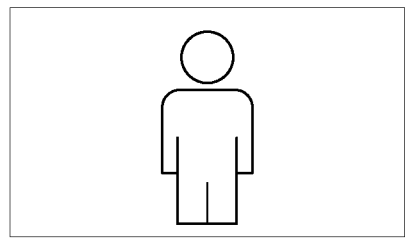
Figure 4:
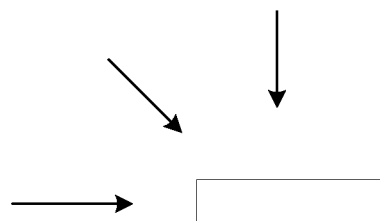

In some instances, in displaying the exchanged streaming content, the enhanced reality device 102 may cause display of a graphical user interface similar to graphical user interface 405 which is displayed in FIG. 4. As seen in FIG. 4, graphical user interface 405 may include a video stream corresponding to an employee of a financial institution corresponding to the automated teller machine terminal platform 103. In some instances, the video stream may be displayed in a portion of the teller assistant experience interface generated at step 218, and may be displayed along with a teller experience notification such as an indication to put a debit card into a particular slot of the automated teller machine terminal platform 103. In some instances, the employee and the customer may be able to communicate with each other via the streaming content displayed at the enhanced reality device 102 and the teller interaction platform 105 respectively. In some instances, the streaming content may be displayed as an augmented reality interface that is displayed as an overlay on top of one or more real-world objects that may be visible through one or more transparent and/or translucent display elements of an augmented reality device, such as enhanced reality device 102 and/or the teller interaction platform 105.

At step 223, the teller interaction platform 105 may receive a teller notification request requesting a notification to be presented to a user of the enhanced reality device 102. In some instances, the teller interaction platform 105 may receive the teller notification request by receiving one of a touch input, a gesture input, an audio input, or the like. In some instances, the teller interaction platform 105 may receive the teller notification request after displaying particular streaming content. For example, the teller interaction platform 105 may display streaming content of a customer who is struggling to find a slot to insert his or her debit card at the automated teller machine terminal platform 103. In this example, the teller interaction platform 105 may receive a user input requesting that a notification be displayed to the customer to highlight the slot into which the debit card may be inserted. This is shown in (and described further above with regard to) FIG. 4. Additionally or alternatively, the teller interaction platform 105 may receive a teller notification request indicating that the automated teller machine terminal platform 103 should be cleaned, repaired, or the like.

At step 224, the teller interaction platform 105 may generate one or more commands directing the enhanced reality teller control platform 104 to generate a teller experience notification. In some instances, the teller interaction platform 105 may generate one or more commands directing the enhanced reality teller control platform 104 to generate an enhanced reality text overlay (e.g., "Please rotate debit card prior to inserting," "Please unfold check," or the like), an enhanced reality notification (e.g., by highlighting the area around a debit card slot, an area where cash will be dispensed, or the like), an audio output, or the like.

Figure 2F:
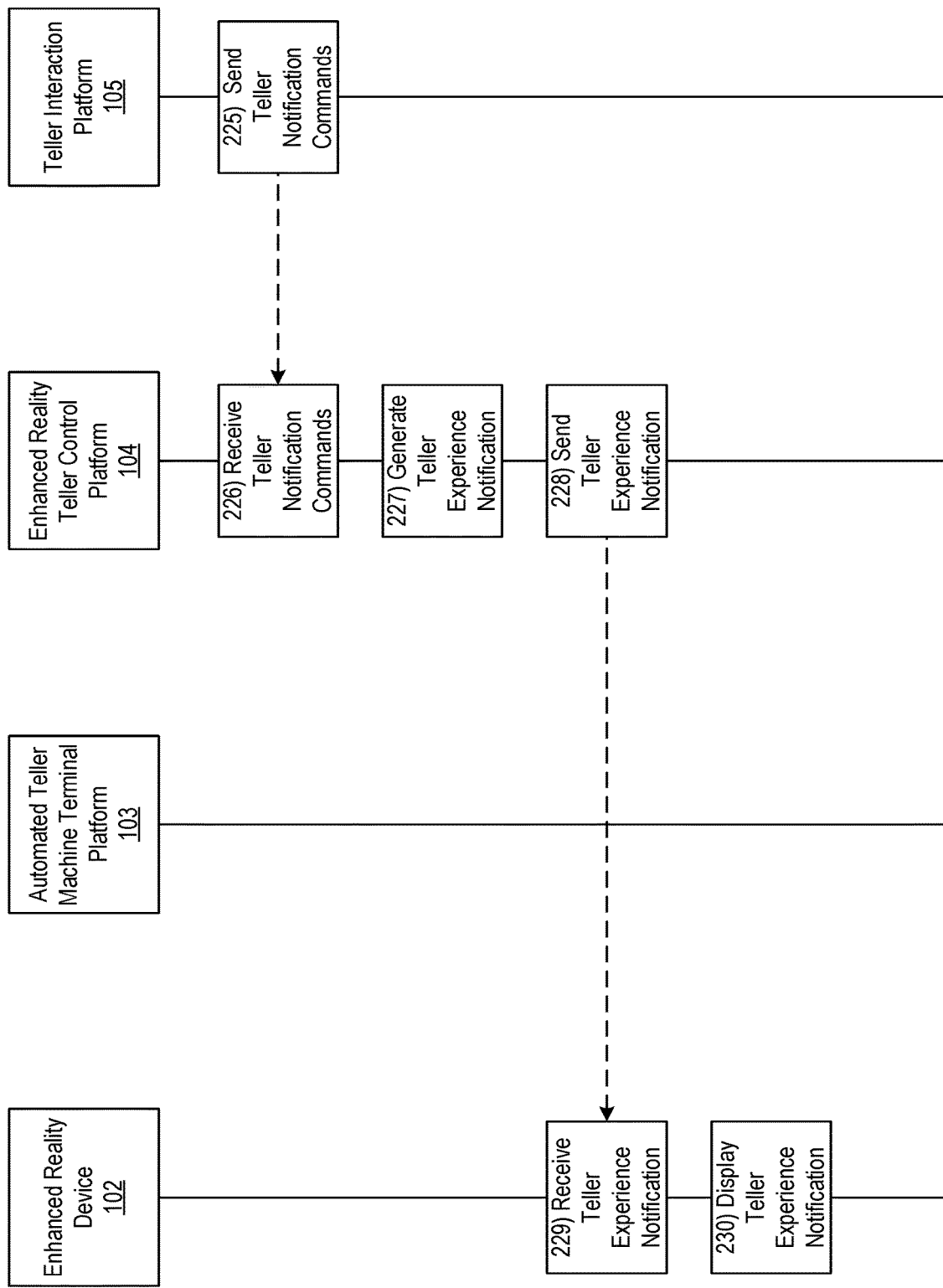

Referring to FIG. 2F, at step 225, the teller interaction platform 105 may send the one or more commands directing the enhanced reality teller control platform 104 to generate the teller experience notification generated at step 224. In some instances, the teller interaction platform 105 may establish a connection with the enhanced reality teller control platform 104. In some instances, the teller interaction platform 105 may establish a third wireless data connection with the enhanced reality teller control platform 104 to link the teller interaction platform 105 to the enhanced reality teller control platform 104. In these instances, the teller interaction platform 105 may send, while the third wireless data connection is established, the one or more commands directing the enhanced reality teller control platform 104 to generate the teller experience notification. Additionally or alternatively, the teller interaction platform 105 may generate the teller experience notification. In these instances, the teller interaction platform 105 may send the teller experience notification to the enhanced reality device 102.

At step 226, the enhanced reality teller control platform 104 may receive the one or more commands directing the enhanced reality teller control platform 104 to generate the teller experience notification sent at step 225. In some instances, the enhanced reality teller control platform 104 may receive, via the communication interface 113 and while the third wireless data connection is established, the one or more commands directing the enhanced reality teller control platform 104 to generate the teller experience notification.

At step 227, the enhanced reality teller control platform 104 may generate the teller experience notification. In some instances, as described above, in generating the teller experience notification, the enhanced reality teller control platform 104 may generate a notification to assist a customer with a transaction at the automated teller machine terminal platform 103 (e.g., "insert card here," "insert check here," "unfold check," "unfold bills," "input PIN," "cash dispensed here," "receipt dispensed here," "ensure that check is signed before entering," or the like). Additionally or alternatively, in generating the teller experience notification, the enhanced reality teller control platform 104 may generate a notification to inform the customer of a security hazard (e.g., "unauthorized personal standing within predetermined perimeter of automated teller machine terminal platform," "unauthorized personnel approaching," "cash to be dispensed after delay for security purposes," "end session immediately," or the like).

At step 228, the enhanced reality teller control platform 104 may send the teller experience notification generated at step 227 to the enhanced reality device 102. In some instances, the enhanced reality teller control platform 104 may send the teller experience notification to the enhanced reality device 102 via the communication interface 113 and while the first wireless data connection is established.

At step 229, the enhanced reality device 102 may receive the teller experience notification sent at step 228. In some instances, the enhanced reality device 102 may receive the teller experience notification from the enhanced reality teller control platform 104 while the first wireless data connection is established.

At step 230, the enhanced reality device 102 may display the teller experience notification received at step 229. In some instances, in displaying the teller experience notification, the enhanced reality device 102 may display a user interface similar to graphical user interface 405, which is further described above with regard to FIG. 4. In some instances, the enhanced reality device 102 may display the teller experience notification along with the streaming video in a portion of the teller assistant experience interface. In some instances, in displaying the teller experience notification, the enhanced reality device 102 may display an overlay on a physical automated teller machine using an enhanced reality interface. In these instances, the enhanced reality device 102 may display an overlay initiated by a remote teller (e.g., using the teller interaction platform 105). Additionally or alternatively, in displaying the teller experience notification, the enhanced reality device 102 may output audio feedback, haptic feedback, or the like.

Figure 2G:
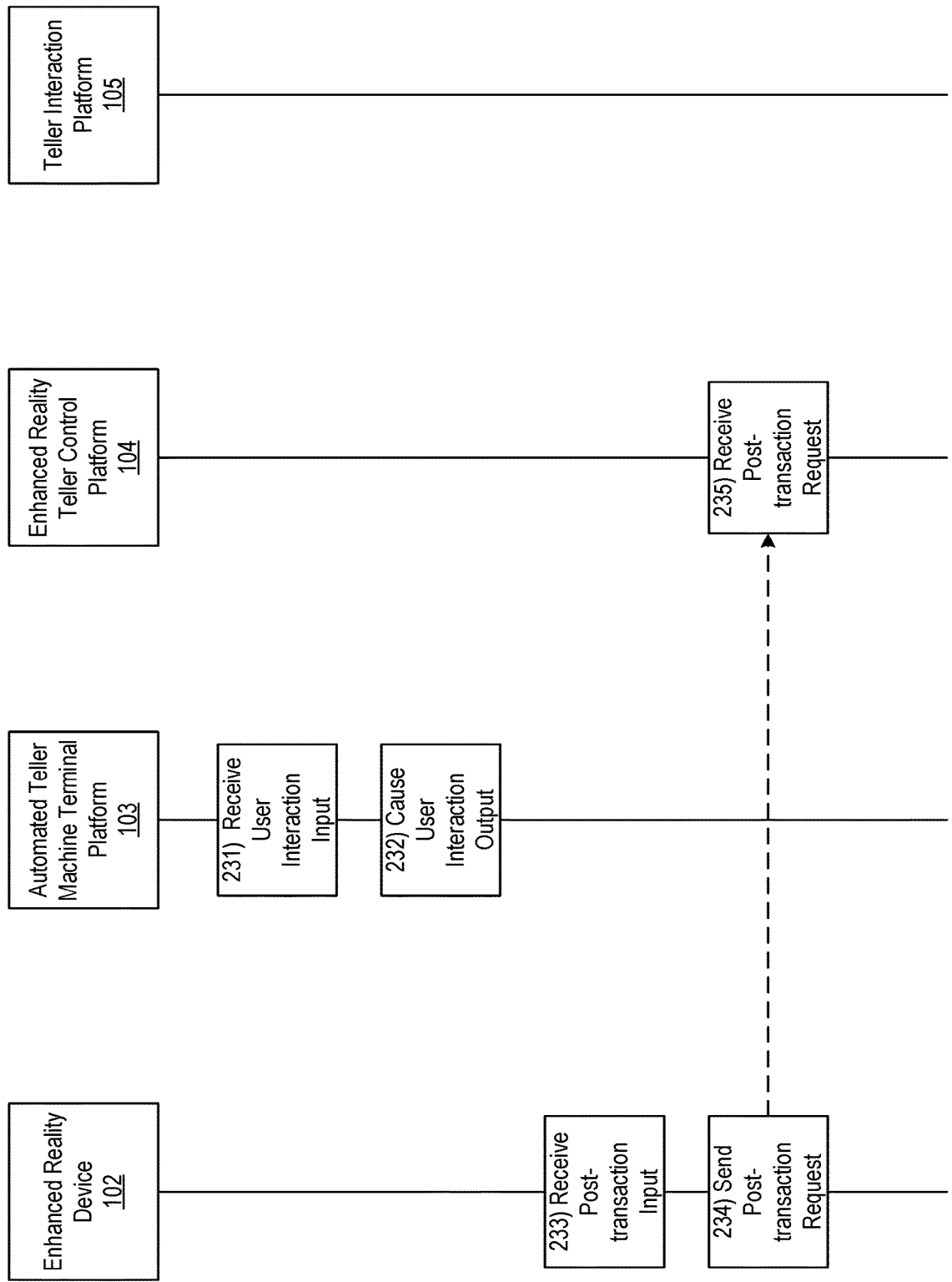

Referring to FIG. 2G, at step 231, the automated teller machine terminal platform 103 may receive a user interaction input. In some instances, in receiving the user interaction input, the automated teller machine terminal platform 103 may determine that a debit card, a check, or the like was inserted into the automated teller machine terminal platform 103. In some instances, the automated teller machine terminal platform 103 may not have video capabilities. Thus, a particular technical advantage of this method is extending the capabilities of the automated teller machine terminal platform 103 by providing video capabilities using an enhanced reality device 102.

At step 232, the automated teller machine terminal platform 103 may cause a user interaction output. In some instances, in causing the user interaction output, the automated teller machine terminal platform 103 may cause cash to be dispensed from the automated teller machine terminal platform 103 in response to receiving the user interaction input. In some instances, a customer may depart from the automated teller machine terminal platform 103 after the user interaction output is caused.

At step 233, the enhanced reality device 102 may receive a post-transaction experience input indicating a request to continue the transaction and/or engage in additional services while the streaming content is still being exchanged with the teller interaction platform 105. In some instances, the post-transaction experience input may be a request to engage in an advertisement that was displayed at the enhanced reality device 102 during the transaction. Additionally or alternatively, the post-transaction experience input may be a request to engage in aspects of the transaction that may be performed although the customer has departed from the automated teller machine terminal platform 103 (e.g., transfer funds, or the like). Additionally or alternatively, the post-transaction experience input may be a request to engage in marketing content and/or alternative services provided by a financial institution corresponding to the automated teller machine terminal platform 103 (e.g., mortgage services, loan services, credit services, or the like). In some instances, the employee of the financial institution who assisted with the original transaction may assist with the continued transaction as well.

In some instances, in receiving the post-transaction experience input, the enhanced reality device 102 may receive a request to handoff the transaction from the employee of the financial institution who assisted with the original transaction to a different employee located in a particular branch office of the financial institution. In these instances, the customer may enter the particular branch office of the financial institution and may discuss the transaction with an employee located in the branch office. Additionally or alternatively, the customer may enter a room at the branch office of the financial institution that corresponds to an enhanced reality experience. In some instances, the customer may interact with an employee located in a different branch office by engaging in the enhanced reality experience.

In some instances, the enhanced reality device 102 may receive the post-transaction experience input via a mobile application displayed on a display of the enhanced reality device 102 and corresponding to the financial institution. In some instances, by continuing the transaction at the enhanced reality device 102 (rather than at the automated teller machine terminal platform 103), the automated teller machine terminal platform 103 may become available for a subsequent transaction by another customer in a shorter period of time than if an entire transaction was conducted at the automated teller machine terminal platform 103. This may result in transaction efficiencies.

At step 234, the enhanced reality device 102 may send a post-transaction experience request based on the post-transaction input received at step 233. In some instances, the enhanced reality device 102 may send the post-transaction experience request to the enhanced reality teller control platform 104 while the first wireless data connection is established.

At step 235, the enhanced reality teller control platform 104 may receive the post-transaction experience request from the enhanced reality device 102. In some instances, the enhanced reality teller control platform 104 may receive the post-transaction experience request from the enhanced reality device 102 via the communication interface 113 and while the first wireless data connection is established.

Figure 2H:
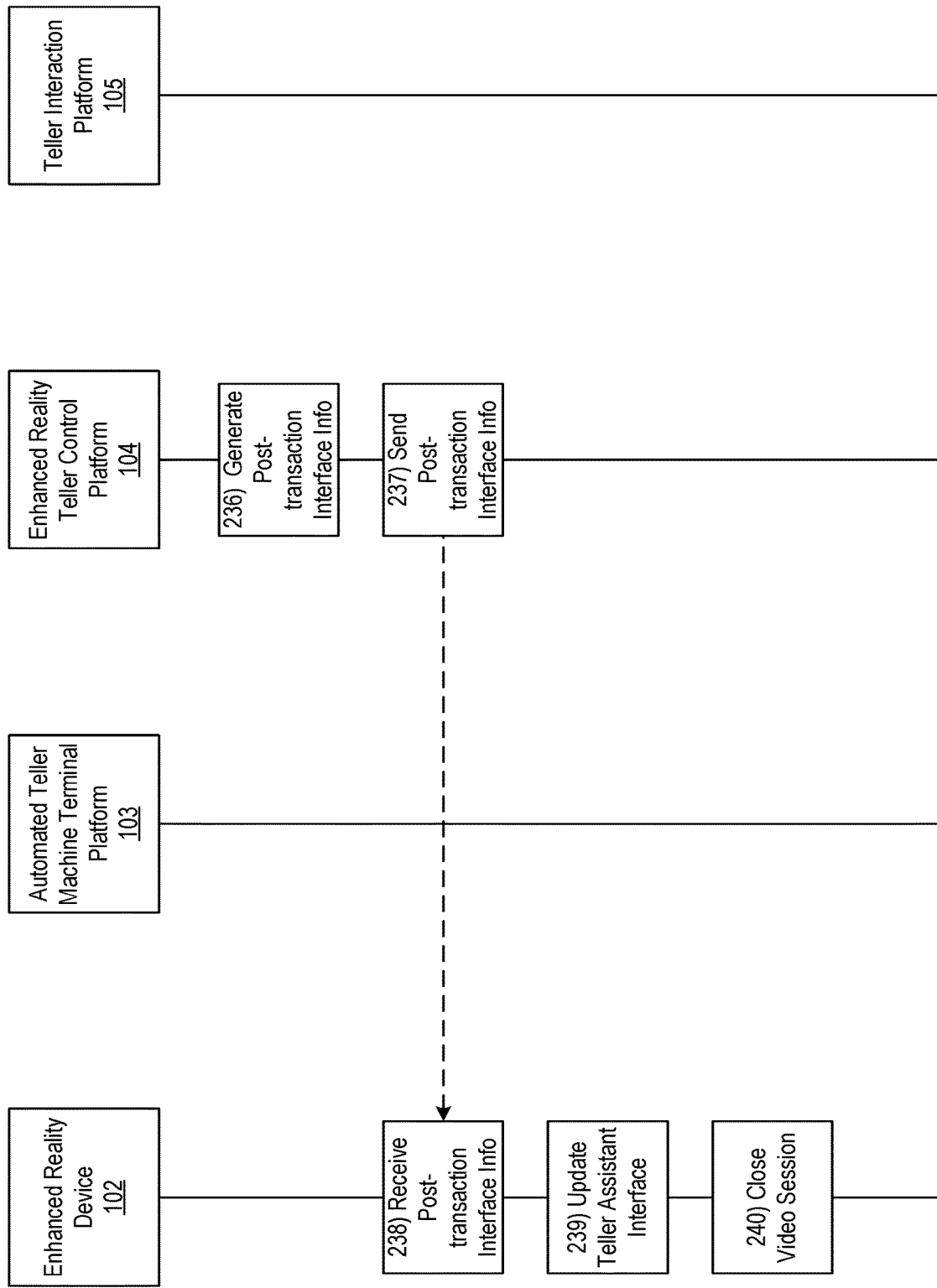

Referring to FIG. 2H, at step 236, the enhanced reality teller control platform 104 may generate post-transaction experience interface information. In some instances, in generating the post-transaction experience interface information, the enhanced reality teller control platform 104 may generate information that may be used to update the teller assistant experience interface to assist the user with the continued transaction. In some instances, the enhanced reality teller control platform 104 may generate the post-transaction experience interface information in response to receiving the post-transaction experience request. Additionally or alternatively, the enhanced reality teller control platform 104 may generate one or more commands directing the enhanced reality device 102 to update the teller assistant experience interface using the post-transaction experience interface information.

At step 237, the enhanced reality teller control platform 104 may send the post-transaction experience interface information and the one or more commands directing the enhanced reality device 102 to update the teller assistant experience interface using the post-transaction experience interface information to the enhanced reality device 102. In some instances, the enhanced reality teller control platform 104 may send, via the communication interface 113 and while the first wireless data connection is established, the post-transaction experience interface information and the one or more commands directing the enhanced reality device 102 to update the teller assistant experience interface using the post-transaction experience interface information to the enhanced reality device 102.

At step 238, the enhanced reality device 102 may receive the post-transaction experience interface information and the one or more commands directing the enhanced reality device 102 to update the teller assistant experience interface using the post-transaction experience interface information. In some instances, the enhanced reality device 102 may receive, while the first wireless data connection is established, the post-transaction experience interface information and the one or more commands directing the enhanced reality device 102 to update the teller assistant experience interface using the post-transaction experience interface information.

At step 239, the enhanced reality device 102 may update the teller assistant experience interface using the post-transaction experience interface information. In some instances, in updating the teller assistant experience interface using the post-transaction experience interface information, the enhanced reality device 102 may display a user interface to assist the user with the continued transaction (e.g., transfer funds, engage in additional services provided by the financial institution, interact with advertisements, view a receipt, complete a survey, resolve claims, or the like). In some instances, the user may have departed from the automated teller machine terminal platform 103 by this point and may be continuing the transaction away from the automated teller machine terminal platform 103.

At step 240, the enhanced reality device 102 may close the video session with the teller interaction platform 105. In some instances, the enhanced reality device 102 may receive a user input indicating that all transactions and interactions are complete, and the video session may be terminated.

Subsequently, the event sequence may end, and the enhanced reality teller control platform 104 may continue to provide a teller assistant experience using enhanced reality interfaces at an enhanced reality device 102 and by initiating a live video stream between the enhanced reality device 102 and a teller interaction platform 105. In providing a video stream at the enhanced reality device 102 while a user of the enhanced reality device 102 is conducting a transaction at an automated teller machine terminal platform 103, the enhanced reality device 102 may extend the capabilities of the automated teller machine terminal platform 103 which may not otherwise include video capabilities. Additionally, by providing the video stream at the teller interaction platform 105, an employee of a financial institution corresponding to the automated teller machine terminal platform 103 may be able to provide security and assistance notifications at the enhanced reality device 102 based on live streaming content corresponding to the transaction. Furthermore, by collecting pre-transaction and post-transaction inputs, the enhanced reality device 102 may allow users to pre-stage transactions prior to arriving at the automated teller machine terminal platform 103 and to continue aspects of the transactions after leaving the automated teller machine terminal platform 103 by causing display of various transaction interfaces at the enhanced reality device 102.

Figure 5:
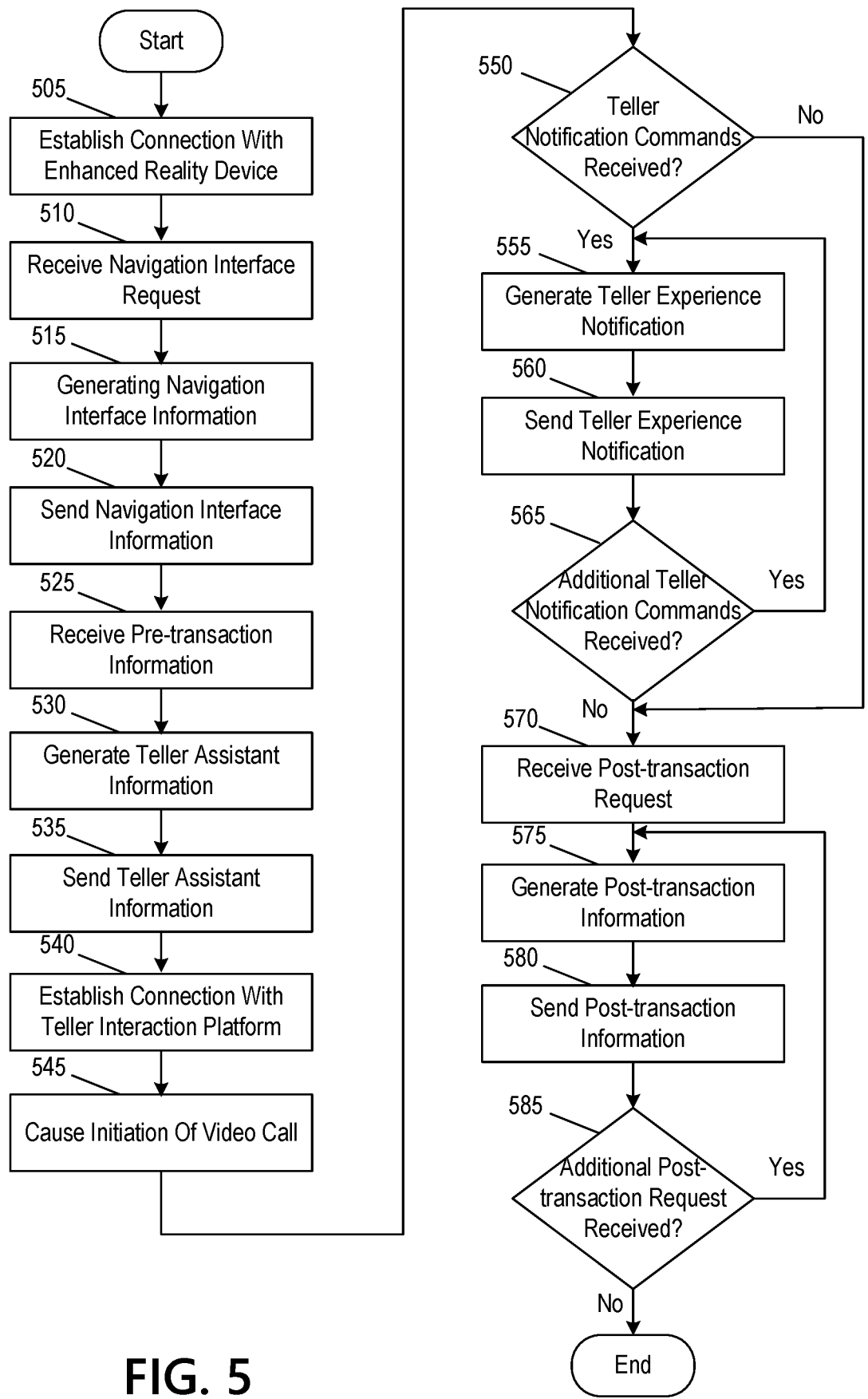
FIGS. 5 and 6 depict illustrative methods for deploying an enhanced processing system that provides a teller assistant experience using enhanced reality interfaces in accordance with one or more example embodiments.

FIG. 5 depicts an illustrative method for deploying an enhanced processing system that provides a teller assistant experience using enhanced reality interfaces in accordance with one or more example embodiments. Referring to FIG. 5, at step 505, a computing platform having at least one processor, a communication interface, and memory may establish a connection with an enhanced reality device. At step 510, the computing platform may receive a navigation interface request from the enhanced reality device. At step 515, the computing platform may generate teller assistant navigation interface information in response to receiving the navigation interface request and one or more commands directing the enhanced reality device to cause display of a teller assistant navigation interface using the teller assistant navigation interface information. At step 520, the computing platform may send the teller assistant navigation interface information and the one or more commands directing the enhanced reality device to cause display of the teller assistant navigation interface using the teller assistant navigation interface information to the enhanced reality device. At step 525, the computing platform may receive pre-transaction information corresponding to a transaction to be conducted at an automated teller machine terminal platform. At step 530, the computing platform may generate teller assistant experience information and one or more commands directing the enhanced reality device to generate a teller assistant experience interface using the teller assistant experience information. At step 535, the computing platform may send the teller assistant experience information to the enhanced reality device. At step 540, the computing platform may establish a connection with a teller interaction platform. At step 545, the computing platform may cause initiation of a video call between the enhanced reality device and the teller interaction platform 105. At step 550, the computing platform may determine whether commands directing the computing platform to generate a teller experience notification were received from the teller interaction platform. If commands directing the computing platform to generate a teller experience notification were not received, the computing platform may proceed to step 570. If commands directing the computing platform to generate a teller experience notification were received, the computing platform may proceed to step 555.

At step 555, the computing platform may generate a teller experience notification and one or more commands directing the enhanced reality device to display the teller experience notification. At step 560, the computing platform may send the teller experience notification and the one or more commands directing the enhanced reality device to display the teller experience notification to the enhanced reality device. At step 565, the computing platform may determine whether commands directing the computing platform to generate an additional teller experience notification were received from the teller interaction platform. If commands directing the computing platform to generate an additional teller experience notification were received, the computing platform may return to step 565. If commands directing the computing platform to generate an additional teller experience notification were not received, the computing platform may proceed to step 570.

At step 570, the computing platform may receive a post transaction experience request from the enhanced reality device. At step 575, the computing platform may generate post-transaction experience interface information and one or more commands directing the enhanced reality device to generate a post-transaction experience interface using the post-transaction experience interface information. At step 580, the computing platform may send the post-transaction experience interface information and the one or more commands directing the enhanced reality device to generate the post-transaction experience interface using the post-transaction experience interface information to the enhanced reality device 102. At step 585, the computing platform may determine whether an additional post-transaction experience interface was received. If an additional post-transaction experience request was received, the computing platform may return to step 575. If an additional post-transaction experience request was not received, the method may end.

Figure 6:
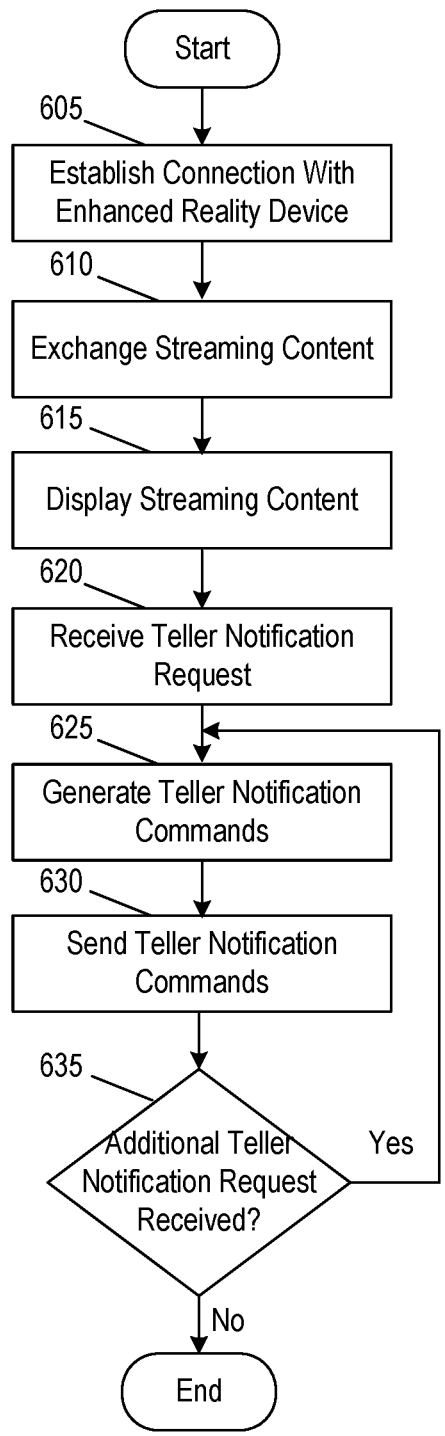

FIG. 6 depicts an illustrative method for deploying an enhanced processing system that provides a teller experience notifications using enhanced reality interfaces in accordance with one or more example embodiments. Referring to FIG. 6, at step 605, a computing platform having at least one processor, a communication interface, and memory may establish a connection with an enhanced reality device. At step 610, the computing platform may exchange streaming content with the enhanced reality device. At step 615, the computing platform may display the received streaming content. At step 620, the computing platform may receive a teller experience notification request. At step 625, the computing platform may generate one or more commands directing the enhanced reality teller control platform 104 to generate the teller experience notification. At step 630, the computing platform may send the one or more commands directing the enhanced reality teller control platform to generate the teller experience notification to the enhanced reality teller control platform. At step 635, the computing platform may determine whether an additional teller experience notification request was received. If an additional teller experience notification request was received, the computing platform may return to step 625. If an additional teller experience notification request was not received, the method may end.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination.

In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
     initiate a video call with an enhanced reality device, wherein initiating the video call with the enhanced reality device causes the enhanced reality device to display a user of the computing platform in a portion of a teller assistance experience interface, wherein the teller assistance experience interface comprises an augmented reality interface that is displayed on one or more transparent elements of the enhanced reality device and is overlaid, within the one or more transparent elements of the enhanced reality device, on an automated teller machine visible through the one or more transparent elements of the enhanced reality device, and wherein initiating the video call with the enhanced reality device causes the computing platform to display a video stream corresponding to a viewpoint of a user of the enhanced reality device, wherein the viewpoint of the user of the enhanced reality device includes a view of the automated teller machine that is visible through the one or more transparent elements of the enhanced reality device;
     receive a request to generate a teller experience notification based on the video stream corresponding to the viewpoint of the user of the enhanced reality device; and
     send, to an enhanced reality teller control platform, one or more commands directing the enhanced reality teller control platform to generate the teller experience notification, wherein sending the one or more commands directing the enhanced reality teller control platform to generate the teller experience notification causes the enhanced reality teller control platform to direct the enhanced reality device to cause display of the teller experience notification wherein causing display of the teller experience notification comprises causing display, within the one or more transparent elements of the enhanced reality device, of the teller experience notification, wherein:
       a location at which to display the teller experience notification within the one or more transparent elements of the enhanced reality device is identified based on a location of one or more elements of the automated teller machine as visible to the user of the enhanced reality device through the one or more transparent elements of the enhanced reality device, and
       the teller experience notification is displayed by the one or more transparent elements of the enhanced reality device at the identified location.

2. The computing platform of claim 1, wherein initiating the video call with the enhanced reality device causes the computing platform to display a video stream corresponding to a rear facing camera of the enhanced reality device.

3. The computing platform of claim 2, wherein the video stream corresponding to the viewpoint of the user of the enhanced reality device is displayed on a display of the computing platform along with the video stream corresponding to a rear facing camera of the enhanced reality device.

4. The computing platform of claim 1, wherein the teller experience notification corresponds to one of an enhanced reality overlay, a haptic feedback output, or an audio output.

5. The computing platform of claim 1, wherein directing the enhanced reality device to cause display of the teller experience notification causes the enhanced reality device to cause display of the teller experience notification along with the teller assistant experience interface.

6. The computing platform of claim 1, wherein the teller experience notification corresponds to one of: a transaction assistance notification to assist the user in conducting a transaction or a security notification to assist the user in safely conducting the transaction.

7. The computing platform of claim 6, wherein the security notification indicates that unidentified personal are located within a predetermined security perimeter corresponding to an automated teller machine terminal platform.

8. The computing platform of claim 6, wherein the transaction corresponds to a transaction conducted at an automated teller machine terminal platform.

9. The computing platform of claim 1, wherein the teller assistance experience interface corresponds to an enhanced reality interface that provides transaction assistance during an automated teller machine transaction.

10. The computing platform of claim 1, wherein the teller experience notification comprises one or more arrows indicating a location of a slot into which a card may be inserted, and wherein the one or more elements of the automated teller machine as visible to the user of the enhanced reality device through the one or more transparent elements of the enhanced reality device comprise the slot into which the card may be inserted.

11. A method comprising:
at a computing platform comprising at least one processor, a communication interface, and memory:
initiating a video call with an enhanced reality device, wherein initiating the video call with the enhanced reality device causes the enhanced reality device to display a user of the computing platform in a portion of a teller assistance experience interface, wherein the teller assistance experience interface comprises an augmented reality interface that is displayed on one or more transparent elements of the enhanced reality device and is overlaid, within the one or more transparent elements of the enhanced reality device, on an automated teller machine visible through the one or more transparent elements of the enhanced reality device, and
wherein initiating the video call with the enhanced reality device causes the computing platform to display a video stream corresponding to a viewpoint of a user of the enhanced reality device, wherein the viewpoint of the user of the enhanced reality device includes a view of the automated teller machine that is visible through the one or more transparent elements of the enhanced reality device;
receiving a request to generate a teller experience notification based on the video stream corresponding to the viewpoint of the user of the enhanced reality device; and
sending, to an enhanced reality teller control platform, one or more commands directing the enhanced reality teller control platform to generate the teller experience notification, wherein sending the one or more commands directing the enhanced reality teller control platform to generate the teller experience notification causes the enhanced reality teller control platform to direct the enhanced reality device to cause display of the teller experience notification wherein causing display of the teller experience notification comprises causing display, within the one or more transparent elements of the enhanced reality device, of the teller experience notification, wherein:
a location at which to display the teller experience notification within the one or more transparent elements of the enhanced reality device is identified based on a location of one or more elements of the automated teller machine as visible to the user of the enhanced reality device through the one or more transparent elements of the enhanced reality device, and
the teller experience notification is displayed by the one or more transparent elements of the enhanced reality device at the identified location.

12. The method of claim 11, wherein initiating the video call with the enhanced reality device causes the computing platform to display a video stream corresponding to a rear facing camera of the enhanced reality device.

13. The method of claim 12, wherein the video stream corresponding to the viewpoint of the user of the enhanced reality device is displayed on a display of the computing platform along with the video stream corresponding to a rear facing camera of the enhanced reality device.

14. The method of claim 12, wherein the teller experience notification corresponds to one of an enhanced reality overlay, a haptic feedback output, or an audio output.

15. The method of claim 12, wherein directing the enhanced reality device to cause display of the teller experience notification causes the enhanced reality device to cause display of the teller experience notification along with the teller assistant experience interface.

16. The method of claim 12, wherein the teller experience notification corresponds to one of: a transaction assistance notification to assist the user in conducting a transaction or a security notification to assist the user in safely conducting the transaction.

17. The method of claim 16, wherein the security notification indicates that unidentified personal are located within a predetermined security perimeter corresponding to an automated teller machine terminal platform.

18. The method of claim 16, wherein the transaction corresponds to a transaction conducted at an automated teller machine terminal platform.

19. One or more non-transitory computer-readable media storing instructions that, when executed by a computing platform comprising at least one processor, a communication interface, and memory, cause the computing platform to:
initiate a video call with an enhanced reality device, wherein initiating the video call with the enhanced reality device causes the enhanced reality device to display a user of the computing platform in a portion of a teller assistance experience interface, wherein the teller assistance experience interface comprises an augmented reality interface that is displayed on one or more transparent elements of the enhanced reality device and is overlaid, within the one or more transparent elements of the enhanced reality device, on an automated teller machine visible through the one or more transparent elements of the enhanced reality device, and wherein initiating the video call with the enhanced reality device causes the computing platform to display a video stream corresponding to a viewpoint of a user of the enhanced reality device, wherein the viewpoint of the user of the enhanced reality device includes a view of the automated teller machine that is visible through the one or more transparent elements of the enhanced reality device;

receive a request to generate a teller experience notification based on the video stream corresponding to the viewpoint of the user of the enhanced reality device; and send, to an enhanced reality teller control platform, one or more commands directing the enhanced reality teller control platform to generate the teller experience notification, wherein sending the one or more commands directing the enhanced reality teller control platform to generate the teller experience notification causes the enhanced reality teller control platform to direct the enhanced reality device to cause display of the teller experience notification wherein causing display of the teller experience notification comprises causing display, within the one or more transparent elements of the enhanced reality device, of the teller experience notification, wherein:

a location at which to display the teller experience notification within the one or more transparent elements of the enhanced reality device is identified based on a location of one or more elements of the automated teller machine as visible to the user of the enhanced reality device through the one or more transparent elements of the enhanced reality device, and the teller experience notification is displayed by the one or more transparent elements of the enhanced reality device at the identified location.

20. The one or more non-transitory computer-readable media of claim 19, wherein initiating the video call with the enhanced reality device causes the computing platform to display a video stream corresponding to a rear facing camera of the enhanced reality device.

* * * * *

UNITED STATES PATENT AND TRADEMARK OFFICE
CERTIFICATE OF CORRECTION

PATENT NO. : 11,164,170 B2  
APPLICATION NO. : 16/929612  
DATED : November 2, 2021  
INVENTOR(S) : Dent et al.

Page 1 of 1

It is certified that error appears in the above-identified patent and that said Letters Patent is hereby corrected as shown below:

On the Title Page

Column 2, Other Publications, Line 1:
Delete "Mar. 2, 20191-U.S." and insert --Mar. 21, 2019-U.S.--

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*